US012791524B2

(12) United States Patent
Blandford et al.

(10) Patent No.: US 12,791,524 B2
(45) Date of Patent: Nov. 10, 2026

(54) TRANSVERSE FEATURE CHARACTERIZATION USING ULTRASONIC SECTORAL SCANNING SYSTEM AND METHOD

(71) Applicant: Verifi Technologies, LLC, Waco, TX (US)

(72) Inventors: Benjamin M. Blandford, Waco, TX (US); Gary Georgeson, Tacoma, WA (US); Irrtisum Khan, Waco, TX (US); David A. Jack, Waco, TX (US)

(73) Assignee: Baylor University, Waco, TX (US)

( * ) Notice: Subject to any disclaimer, the term of this patent is extended or adjusted under 35 U.S.C. 154(b) by 282 days.

(21) Appl. No.: 18/617,122

(22) Filed: Mar. 26, 2024

(65) Prior Publication Data

US 2024/0329002 A1 Oct. 3, 2024

Related U.S. Application Data

(60) Provisional application No. 63/456,244, filed on Mar. 31, 2023.

(51) Int. Cl.

*G01N 29/06* (2006.01)
*G01N 29/22* (2006.01)
*G01N 35/00* (2006.01)

(52) U.S. Cl.

CPC ....... *G01N 29/0654* (2013.01); *G01N 29/225* (2013.01); *G01N 35/0099* (2013.01);
(Continued)

(58) Field of Classification Search

CPC ..... G01N 2291/0231; G01N 2291/106; G01N 29/043; G01N 29/0645; G01N 29/0654; G01N 29/069; G01N 29/225; G01N 29/262; G01N 29/265; G01N 29/4481; G01N 35/0099; G01N 29/223; G01N 29/041;
(Continued)

(56) References Cited

U.S. PATENT DOCUMENTS 10,161,910 B2 12/2018 Dehghan Niri et al.
10,605,781 B2 3/2020 Grewal et al.
(Continued)

FOREIGN PATENT DOCUMENTS

CN 109813808 A * 5/2019
CN 114519792 A * 5/2022 ........... G06T 7/0004
(Continued)

*Primary Examiner* — John E Breene
*Assistant Examiner* — Truong D Phan
(74) *Attorney, Agent, or Firm* — Neo IP

(57) ABSTRACT

A system is disclosed for detecting and characterizing wrinkles within a test object utilizing ultrasonic non-destructive testing (NDT). The system includes a phased-array ultrasonic probe having multiple elements, wherein the elements of the phased-array are able to be manipulated to change the steering angle relative to the surface of the test object of a focused beam produced by the phrased-array ultrasonic probe. Alternatively, the system is able to include an ultrasonic transducer operable to be physically rotated with respect to the surface of the test object. By changing the steering angle of the probe, the device performs a sectorial scan providing for improved resolution of wrinkles within the test object.

18 Claims, 14 Drawing Sheets

(52) U.S. Cl.
CPC ................ *G01N 2291/0231* (2013.01); *G01N 2291/106* (2013.01)

(58) Field of Classification Search
CPC ..... G01N 2291/0289; G01N 2291/044; G01N 2021/8864; G01N 21/8851; G01N 21/892; G01N 21/894; G01N 2021/8967; G01N 21/9505; G01N 23/18; G01N 29/4445; G01N 33/2045; G01N 2223/646; G01N 2223/6462; G01N 2203/0062; G01N 2203/006; G01N 27/82; G01N 27/61; G01N 27/24; G01N 27/20; G01N 25/72; G01N 22/02; G01N 21/896; G01N 2021/8962; G01N 29/4463; G10K 11/34; B06B 1/0607; B06B 1/085; B06B 1/064; B06B 1/0688
USPC ........................... 73/628, 592, 598, 600, 615
See application file for complete search history.

(56) References Cited

U.S. PATENT DOCUMENTS

| | | | | |
|---|---|---|---|---|
| 2017/0261472 | A1* | 9/2017 | Schulz | G01N 29/245 |
| 2018/0120268 | A1 | 5/2018 | Georgeson et al. | |
| 2021/0302375 | A1* | 9/2021 | Jack | G01N 29/26 |
| 2021/0383548 | A1* | 12/2021 | Wilson | G06T 5/70 |
| 2023/0221284 | A1* | 7/2023 | Wu | F16L 55/40<br>73/618 |

FOREIGN PATENT DOCUMENTS

| | | | | |
|---|---|---|---|---|
| EP | 2667187 | A1 | | 11/2013 |
| RU | 2785522 | C1 | * | 12/2022 |

* cited by examiner

TRANSVERSE FEATURE CHARACTERIZATION USING ULTRASONIC SECTORAL SCANNING SYSTEM AND METHOD

CROSS-REFERENCE TO RELATED APPLICATIONS

This application is related to and claims priority from the following US patents and patent applications: this application claims priority from and the benefit of U.S. Provisional Patent Application No. 63/456,244, filed Mar. 31, 2023, which is incorporated herein by reference in its entirety.

BACKGROUND OF THE INVENTION

1. Field of the Invention

The present invention relates to ultrasonic non-destructive scanning systems and methods, and more specifically to systems and methods of characterizing wrinkles and other transverse defects or features within a test object using ultrasonic non-destructive testing.

2. Description of the Prior Art

Non-destructive Testing (NDT), also known as Non-destructive Evaluation (NDE) or Non-destructive Inspection (NDI), has achieved popularity in testing materials and parts of larger machines as the methods do not generally render the material or part unfit for its intended purpose. Traditional methods of NDT include ultrasonic and thermographic techniques, as well as ones based on the use of eddy currents, radiation (including gamma, X-ray, and microwave), magnetic particles, dye penetrants, and more. NDT has traditionally been used to detect surface or sub-surface flaws of a material, detect delamination between different layers of a material, or indicate the presence of other irregularities or foreign object debris within a material. In some instances, some varieties of NDT, including thermographic and ultrasonic methods, have been used to detect and characterize wrinkles within a part.

Prior art patent documents include the following:

US Patent Publication No. 2018/0120268 for Wrinkle Characterization and Performance Prediction for Composite Structures by inventors Georgeson et al., filed Oct. 31, 2016 and published May 3, 2018, discloses methods that provide wrinkle characterization and performance prediction for wrinkled composite structures using automated structural analysis. In accordance with some embodiments, the method combines the use of B-scan ultrasound data, automated optical measurement of wrinkles and geometry of cross-sections, and finite element analysis of wrinkled composite structure to provide the ability to assess the actual significance of a detected wrinkle relative to the intended performance of the structure. The disclosed method uses an ultrasonic inspection system that has been calibrated by correlating ultrasonic B-scan data acquired from reference standards with measurements of optical cross sections (e.g., micrographs) of those reference standards.

U.S. Pat. No. 10,605,781 for Methods for measuring out-of-plane wrinkles in composite laminates by inventors Grewal et al., filed Mar. 9, 2018 and issued Mar. 31, 2020, discloses methods for measuring out-of-plane wrinkles in composite laminates. An example method includes scanning a first side of a composite laminate with an ultrasonic transducer. The method further includes locating an out-of-plane wrinkle of the composite laminate on a B-scan ultrasound image generated in response to the scanning of the first side of the composite laminate. The method further includes associating a first marker with the B-scan ultrasound image, the first marker determined based on a location of a crest of the out-of-plane wrinkle on the B-scan ultrasound image. The method further includes associating a second marker with the B-scan ultrasound image, the second marker determined based on a location of a trough focal point of the out-of-plane wrinkle on the B-scan ultrasound image. The method further includes determining an amplitude of the out-of-plane wrinkle based on a distance between the first marker and the second marker.

U.S. Pat. No. 10,161,910 for Methods of non-destructive testing and ultrasonic inspection of composite materials by inventors Niri et al., filed Jan. 11, 2016 and issued Dec. 25, 2018, discloses a method of non-destructive testing including locating an ultrasonic transducer with respect to a component having a visually-inaccessible structure to collect B-scan data from at least one B-scan of the component and to collect C-scan data from at least one C-scan of the component. The method also includes filtering the B-scan data and the C-scan data to remove random noise and coherent noise based on predetermined geometric information about the visually-inaccessible structure to obtain filtered data. The method further includes performing linear signal processing and nonlinear signal processing to determine a damage index for a plurality of voxels representing the visually-inaccessible structure from the filtered B-scan data and the filtered C-scan data to generate a V-scan image. A method of non-destructive testing of a wind turbine blade and an ultrasound system are also disclosed.

US Patent Publication No. 2021/0302375 for System and method for real-time visualization of defects in a material by inventors Jack et al., filed Jan. 13, 2021 and published Sep. 30, 2021, discloses a system and method for real-time visualization of a material during ultrasonic non-destructive testing. The system includes a graphical user interface (GUI) capable of showing a three-dimensional (3-D) image of a composite laminate constructed of a series of two-dimensional (2-D) cross sections. The GUI is capable of displaying the 3-D image as each additional 2-D cross section is scanned by an ultrasonic testing apparatus in real time or near real time, including probable defect regions that contain a flaw such as a hole, crack, wrinkle, or foreign object within the composite. Furthermore, in one embodiment, the system includes an artificial intelligence capable of highlighting defect areas within the 3-D image in real time or near real time and providing data regarding each defect area, such as the depth, size, and/or type of each defect.

European Patent No. 2,667,187 for Ultrasonic non-destructive inspection system, in particular for composite material structures for aeronautical applications by inventors Cavaccini et al., filed Dec. 30, 2011 and issued May 13, 2015, discloses an ultrasonic non-destructive inspection system for a composite material structure including a first incidence surface and a first back surface arranged at a distance from the incidence surface, to detect at least a first defect located between the first incidence surface and the first back surface, comprising: a first scanning probe; a first motor configured to move the first scanning probe to a plurality of first inspection points along a first scanning direction of the structure, the scanning probe being configured to generate, for each of the first inspection points, an ultrasonic signal incident on the first incidence surface and acquire a reflected ultrasonic signal indicative of the presence of the first defect; and processing means configured to (i) process, for each of the first inspection points, the reflected ultrasonic signal to extract a first echo signal related to a defect reflection generated by the first defect; (ii) associate an amplitude value and a time-of-flight value with the first echo signal; (iii) fit the amplitude and time-of-flight values associated with the first echo signals; and (iv) estimate the width of the first defect on the basis of at least one parameter of the first or second interpolation function. The depth of the first defect is determined by plotting the logarithmic spectrogram of a difference between the echo signals obtained from the defectuous composite material structure and a reference structure free of defects. The ultrasonic inspection is carried out by using an ultrasonic crawler comprising a first scanning head for translational scanning and a second scanning head for rotational scanning.

SUMMARY OF THE INVENTION

The present invention relates to ultrasonic non-destructive scanning systems and methods, and more specifically to systems and methods of characterizing wrinkles within a test object using ultrasonic non-destructive testing.

It is an object of this invention to provide improved resolution in characterizing wrinkles using ultrasonic scanning relative to existing systems and methods.

In one embodiment, the present invention is directed to an ultrasonic non-destructive testing system for detecting and characterizing transverse features, including a plurality of ultrasonic elements constituting an ultrasonic array, one or more pulser receivers configured to transmit pulses to actuate the plurality of ultrasonic elements, and a processor, wherein, in conducting a scan of a test object, the one or more pulser receivers are operable to introduce individual delays in signals actuating each of the plurality of ultrasonic elements to steer a beam produced by the ultrasonic array, wherein the ultrasonic array is configured to generate scans of the test object across a range of angles, thereby generating a sectorial scan from a particular point above the test object, wherein the ultrasonic array is moved in a raster motion above the test object to produce a plurality of sectorial scans providing volumetric scan data, and wherein the processor generates an image of the test object including at least one wrinkle based on the volumetric scan data.

In another embodiment, the present invention is directed to an ultrasonic non-destructive testing method of detecting and characterizing transverse features, including one or more pulser receivers transmitting pulses to actuate a plurality of ultrasonic elements, constituting an ultrasonic array, to conduct a scan, the one or more pulser receivers introducing individual delays in signals actuating each of the plurality of ultrasonic elements to steer a beam produced by the ultrasonic array, the ultrasonic array generating scans of the test object across a range of angles, thereby generating a sectorial scan from a particular point above the test object, moving the ultrasonic array in a raster motion above the test object to produce a plurality of sectorial scans, thereby providing volumetric scan data, and a processor generating an image of the test object including at least one wrinkle based on the volumetric scan data.

In yet another embodiment, the present invention is directed to an ultrasonic non-destructive testing system for detecting and characterizing transverse features, including a plurality of ultrasonic elements constituting an ultrasonic array, and one or more pulser receivers configured to transmit pulses to actuate the plurality of ultrasonic elements, wherein, in conducting a scan of a test object, the one or more pulser receivers are operable to introduce individual delays in signals actuating each of the plurality of ultrasonic elements to steer a beam produced by the ultrasonic array, wherein the ultrasonic array is configured to generate scans of the test object across a range of angles, thereby generating a sectorial scan from a particular point above the test object, and wherein an angle-corrected gain factor is applied to individual angle scans constituting each sectorial scan, and wherein the angle-corrected gain factor for higher magnitude steering angles is greater than the angle-corrected gain factor for lower magnitude steering angles.

These and other aspects of the present invention will become apparent to those skilled in the art after a reading of the following description of the preferred embodiment when considered with the drawings, as they support the claimed invention.

DETAILED DESCRIPTION

Figure 1:
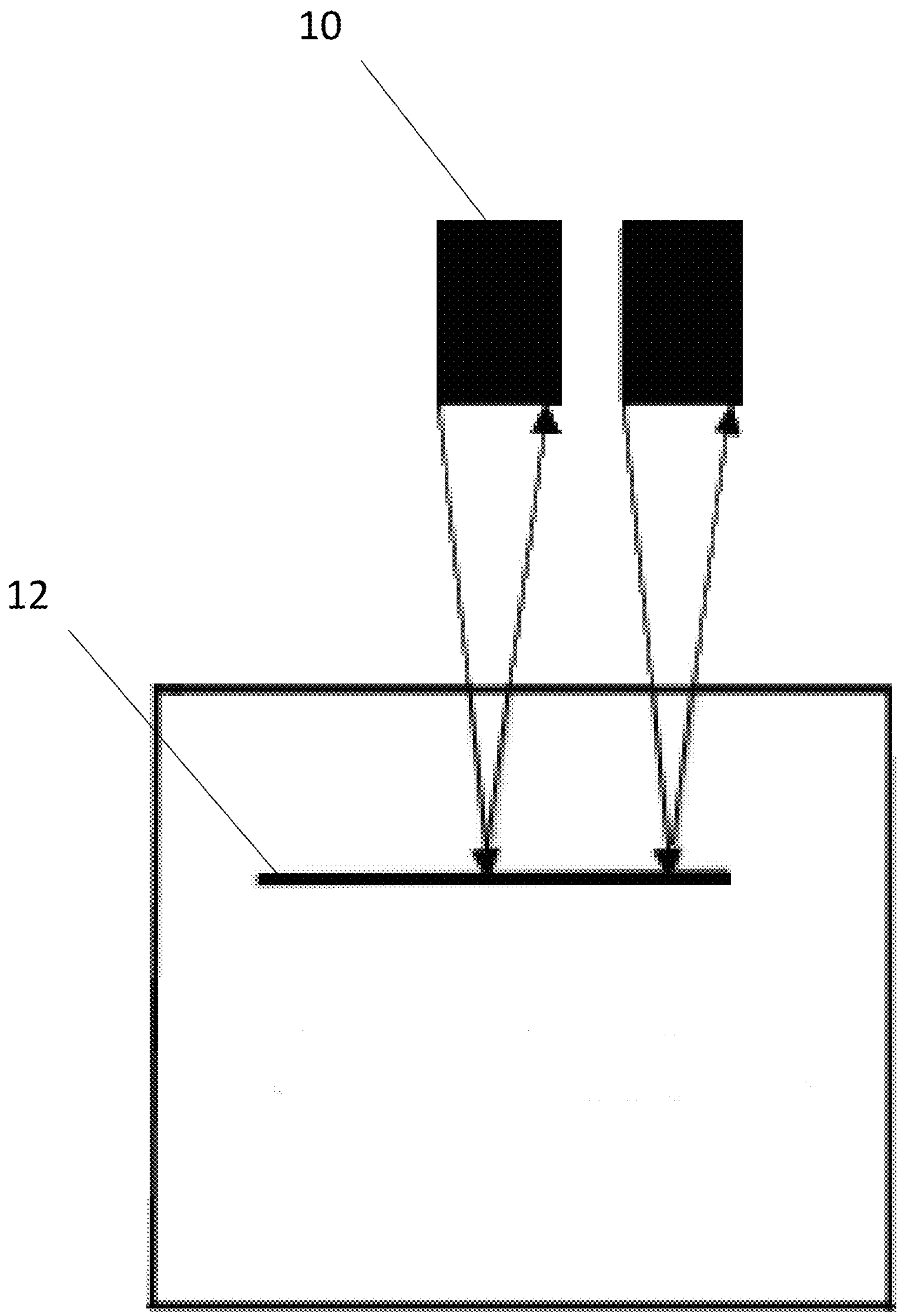
FIG. 1 illustrates a plurality of ultrasonic elements emitting a beam directed substantially orthogonal to a feature within a test object.

The present invention relates to ultrasonic non-destructive scanning systems and methods, and more specifically to systems and methods of characterizing wrinkles within a test object using ultrasonic non-destructive testing.

In one embodiment, the present invention is directed to an ultrasonic non-destructive testing system for detecting and characterizing transverse features, including a plurality of ultrasonic elements constituting an ultrasonic array, one or more pulser receivers configured to transmit pulses to actuate the plurality of ultrasonic elements, and a processor, wherein, in conducting a scan of a test object, the one or more pulser receivers are operable to introduce individual delays in signals actuating each of the plurality of ultrasonic elements to steer a beam produced by the ultrasonic array, wherein the ultrasonic array is configured to generate scans of the test object across a range of angles, thereby generating a sectorial scan from a particular point above the test object, wherein the ultrasonic array is moved in a raster motion above the test object to produce a plurality of sectorial scans providing volumetric scan data, and wherein the processor generates an image of the test object including at least one wrinkle based on the volumetric scan data.

In another embodiment, the present invention is directed to an ultrasonic non-destructive testing method of detecting and characterizing transverse features, including one or more pulser receivers transmitting pulses to actuate a plurality of ultrasonic elements, constituting an ultrasonic array, to conduct a scan, the one or more pulser receivers introducing individual delays in signals actuating each of the plurality of ultrasonic elements to steer a beam produced by the ultrasonic array, the ultrasonic array generating scans of the test object across a range of angles, thereby generating a sectorial scan from a particular point above the test object, moving the ultrasonic array in a raster motion above the test object to produce a plurality of sectorial scans, thereby providing volumetric scan data, and a processor generating an image of the test object including at least one wrinkle based on the volumetric scan data.

In yet another embodiment, the present invention is directed to an ultrasonic non-destructive testing system for detecting and characterizing transverse features, including a plurality of ultrasonic elements constituting an ultrasonic array, and one or more pulser receivers configured to transmit pulses to actuate the plurality of ultrasonic elements, wherein, in conducting a scan of a test object, the one or more pulser receivers are operable to introduce individual delays in signals actuating each of the plurality of ultrasonic elements to steer a beam produced by the ultrasonic array, wherein the ultrasonic array is configured to generate scans of the test object across a range of angles, thereby generating a sectorial scan from a particular point above the test object, and wherein an angle-corrected gain factor is applied to individual angle scans constituting each sectorial scan, and wherein the angle-corrected gain factor for higher magnitude steering angles is greater than the angle-corrected gain factor for lower magnitude steering angles.

Ultrasonic testing is one of the most popular methods of non-destructive testing (NDT), also known as non-destructive inspection (NDI) or non-destructive evaluation (NDE). Ultrasonic testing involves the emission of ultrasonic waves into a test material by a transducer and the subsequent sensing of reflecting or transmitted waves by a receiver. In pulse-echo, or reflection, configurations, high frequency ultrasonic energy is introduced to and transmitted through the surface of the test material in waves, reflected off the back side of the structure and/or internal features, and transmitted back through the material, exiting through the front surface of test material, and are measured by the transmitter (transducer). The use of such systems typically requires an acoustic medium (e.g., water, gel) to bridge the gap between the transducer and the test material. As the waves propagate through the thickness of the test material, discontinuities within the test material (due to material changes, cracks, delaminations, foreign objects, etc.) cause a reflection of the wave, which can then be detected by the transducer and displayed or characterized. In contrast, in through transmission configurations, a transducer generates high frequency ultrasonic energy, which is transmitted through one side of a test material and then received by a corresponding receiver on the opposite side of the test material. As the waves propagate through the thickness of the test material, discontinuities within the test material cause waves in some areas to be slowed, attenuated partially, attenuated fully (resulting in no transmitted signal), or scattered before they reach the receiver. The receiver is then able to characterize the test material by measuring the degree of attenuation of the ultrasonic wave.

When the ultrasonic waves emitted by an ultrasonic transducer contact a material with different properties than the ones they are initially traveling through, some waves are reflected back with varying intensities in accordance with Equation 1 below, though it should be noted that other waves are scattered and do not return to the transmitter.

$$R = \frac{Z_2 - Z_1}{Z_1 + Z_2} \quad \text{(Equation 1)}$$

In Equation 1, R is a reflection coefficient, which is a decimal value representing the percentage of waves reflected at the boundary between two materials. $Z_1$ and $Z_2$ are the acoustic impedances of the two materials that make up the material boundary. The acoustic impedance of a material is found by multiplying the speed of sound for the material by its density. Additionally, the speed of sound for the material is found by dividing the square root of the Young's modulus of the material by the square root of the density of the material. Therefore, based on the percentage of waves reflected, a user is able to calculate the reflection coefficient for the interaction. If the acoustic impedance for one material is known, the identity of the other material is able to be found using Equation 1. Alternatively, the speed of sound for a material is able to be determined experimentally by simply placing a sound emitting source on one side of a material and measuring when a receiver on the other side of the material receives a corresponding signal.

Phased Array ultrasonic probes often allow for greater precision and flexibility than single element probes. A phased array ultrasonic probe includes a plurality of ultrasonic transducer elements spaced apart and each connected to a separate pulser receiver. The overall signal produced by firing one or more of the transducers of the phased array is able to be modeled as one larger wave or as a focused beam. Focal laws are mathematical formulas indicating which elements of the array are to be fired and with what delay. By changing the delay pattern, the properties of the overall beam are able to be changed. For example, by firing elements closer to the outside of the array before the elements closer to the interior of the array, a more focused beam is able to be produced. By firing the elements in a pattern from left to right, an angled beam is able to be produced. The angle of the beam is also able to be changed during the inspection, and the resultant B-scan images are able to be stitched together to produce what is called a sectorial scan. Additionally, by firing only a subset of the elements of the array at any given moment of a scan, the active aperture of the phased array is able to be changed.

One defect that has the potential to impact the mechanical properties of a composite laminate is a wrinkle or waviness in the layers of the composite. Wrinkles between layers of the composite frequently occur during manufacturing, when the composite is curing but pressure on layers of the laminate is not adequately maintained dure the cure. This occurs more readily for pieces with complex curves due to the challenge of maintaining uniform pressure on these types of geometries. For thin parts or for parts where wrinkles are relatively quite large, these abnormalities are often spotted early through a simple visual analysis of the surface of the part. However, for thicker composites, especially where the wrinkle amplitude is small relative to the thickness of the part and where the wrinkle is in a layer distant from the surface of the part, visual analysis often does not reveal an issue, as the part will appear to be smooth on its surface.

When a composite having wrinkles is put into tension, the wrinkled layer is frequently not taut like each of the other layers, meaning it is not engaged in tension and does not contribute to the overall strength of the composite laminate. Additionally, when a composite is placed in compression, the wrinkle is able to buckle instead of engaging the load, leading to a noticeable decrease in the compressive strength of the composite. This frequently causes the composite to fail prematurely. In order to be able to detect the majority of wrinkles big enough to significantly impact the performance of a composite, ultrasonic testing systems need to be able to at least detect wrinkles with an amplitude of 0.4 mm or larger. Current ultrasonic systems are unable to achieve this resolution and therefore are highly likely to miss important defects in a composite. In addition to the size of the wrinkles, of critical importance in evaluating the potential danger of a wrinkle is its aspect ratio. The aspect ratio of a wrinkle is defined as the amplitude of the wrinkle divided by the half wavelength. Wrinkles with low aspect ratios are more difficult to detect because at longer length scales, they often appear to be flat relative to adjacent layers. Therefore, systems being able to detect wrinkles with low aspect ratios is often as critical as being able to detect wrinkles with low amplitudes.

None of the prior art discloses using a phased-array ultrasonic system to accurately detect and characterize wrinkles within a composite (e.g., a carbon fiber composite) using sectorial scans to improve accuracy. For examples, system such as those described in U.S. Pat. No. 10,605,781 make no mention of angling the beam produced by a transducer array in order to detect sections of a wrinkle having different orientation.

Prior art methods of detecting wrinkles, such as that described in the article "Wrinkle detection with Ultrasonic Phased Array technology" by Fernandez-Lopez et al. (2014), which is incorporated herein by reference in its entirety, fail to describe systems capable of accurately characterizing wrinkles, especially for parts primarily, or entirely, comprising carbon fiber. For example, the system described in Fernandez-Lopez et al. was tested on a carbon fiber composite, but required that a glass fiber fabric be inserted into the carbon fiber in order for the wrinkle to be fully visible on the scan, let alone able to be characterized. This is likely due to the system described in Fernandez-Lopez et al. only being fully sensitive to larger acoustic mismatches between the carbon fiber and the glass fiber, while the system lacks the sensitivity or precision to detect impedance mismatches between the carbon fiber layers themselves. Furthermore, the system described in Fernandez-Lopez et al. only sweeps its beam between-7 and 7 degrees relative to the surface of the part, making it less precise in characterizing wrinkles having a greater amplitude (and therefore having features with a greater angle relative to the surface of the part). Furthermore, the purpose of the sectorial scan in Fernandez-Lopez et al. is for detection of wrinkles, not characterization of those wrinkles. Therefore, Fernandez-Lopez et al. never contemplates combining the signals from different sectorial angles to create a single, well-defined B-scan image. Because of this, the system in Fernandez-Lopez is unable to determine start and stop points for the wrinkle, notably decreasing the ability of the system to assess the severity of the wrinkle and provide meaningful data for determining part quality. Furthermore, Fernandez-Lopez et al. utilizes a 5 MHz array, which limits the spatial resolution of the system, preventing it from characterizing the geometry of wrinkles as accurately as the method of the present invention.

Increasing precision in characterizing wrinkles is important, as low precision of existing systems forces companies to overdesign devices, as even wrinkles with tolerably low aspect ratios cause the part to be rejected. Therefore, being able to deal with edge cases and to determine which wrinkles require a part to be serviced or replaced and which wrinkles are tolerable has the potential to save companies large amounts of time and resources. For example, if inspectors have a tolerable aspect ratio of 0.5 for wrinkles, above which the part needs to be serviced or replaced, and it is only able to be determined that a wrinkle has an aspect ratio between 0.45 and 0.55, then the part will need to be serviced or replaced, regardless of whether the wrinkle is actually tolerable or not. Some companies have even began introducing sensors or other components within the part itself to monitor for wrinkles and increase precision. However, adding these components adds expense and manufacturing complications and are preferably able to be removed, or at least reduced in number, if a device is capable of achieving higher precision while scanning the exterior of the part.

The present invention utilizes sectorial scans driven by an array of ultrasonic transducer elements to provide high precision characterization of wrinkles. Sectorial scans have been used in other industries and fields, such as in medical ultrasonograms where they have been used to cover a range of angles for the medical image originating from a single point, with the cross-sectional area covered by this scanning method being known as a "sector." However, in performing these scans for medical purposes, raster motion is not utilized with the sectorial scan and the scan is generated from a single location. If an acoustic wedge is used, the range of angles across which the scan sweeps depends upon the speed of sound in the wedge material and the test object, following Snell's Law.

Referring now to the drawings in general, the illustrations are for the purpose of describing one or more preferred embodiments of the invention and are not intended to limit the invention thereto.

Figure 2:
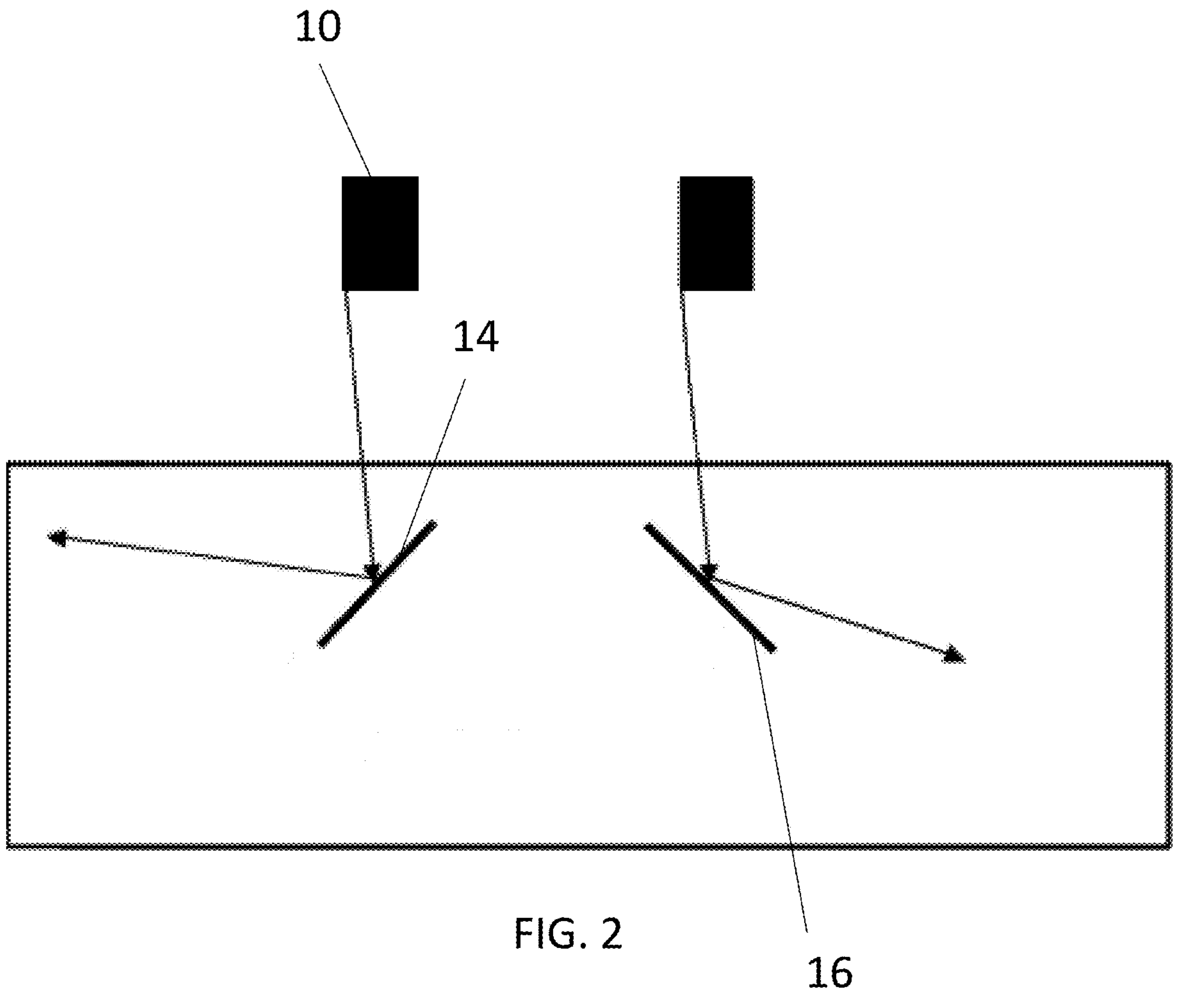
FIG. 2 illustrates a plurality of ultrasonic elements emitting a beam not directed substantially orthogonal to a feature within a test object.

FIG. 1 illustrates a plurality of ultrasonic elements emitting a beam directed substantially orthogonal to a feature within a test object. As shown in FIG. 1, typically during ultrasonic non-destructive testing, the ultrasonic probe 10 is set-up such that it emits an ultrasonic beam substantially orthogonal to a testing surface of a test object. When operating in pulse-echo mode, it is expected for the beam to reflect off a feature 12 within a part (e.g., a wrinkle, a foreign object, a delamination, etc.) and return to the transducer. The amplitude and time of the return signal is then able to be used to detect the feature and identify its location within the part. However, this set-up assumes that the beam is not only substantially orthogonal to a testing surface of the part, but also to the feature itself. In instances in which the feature 14, 16 is not substantially orthogonal to the beam (and therefore not substantially parallel to the testing surface of the test object), as shown in FIG. 2, much of the beam reflects in a direction away from the transducer 10 (and/or a receiver paired with the transducer, depending on the set-up), therefore resulting in a much lower amplitude return signal and potentially causing the transducer to miss the feature entirely. It will be understood by one of ordinary skill in the art that for features with non-flat geometry, such as wrinkles, this same effect is potentially observed for only a portion of the feature. For example, the crest of the wrinkle is visible, by the sides of the wrinkle are difficult if not impossible to accurately detect.

Figure 3:
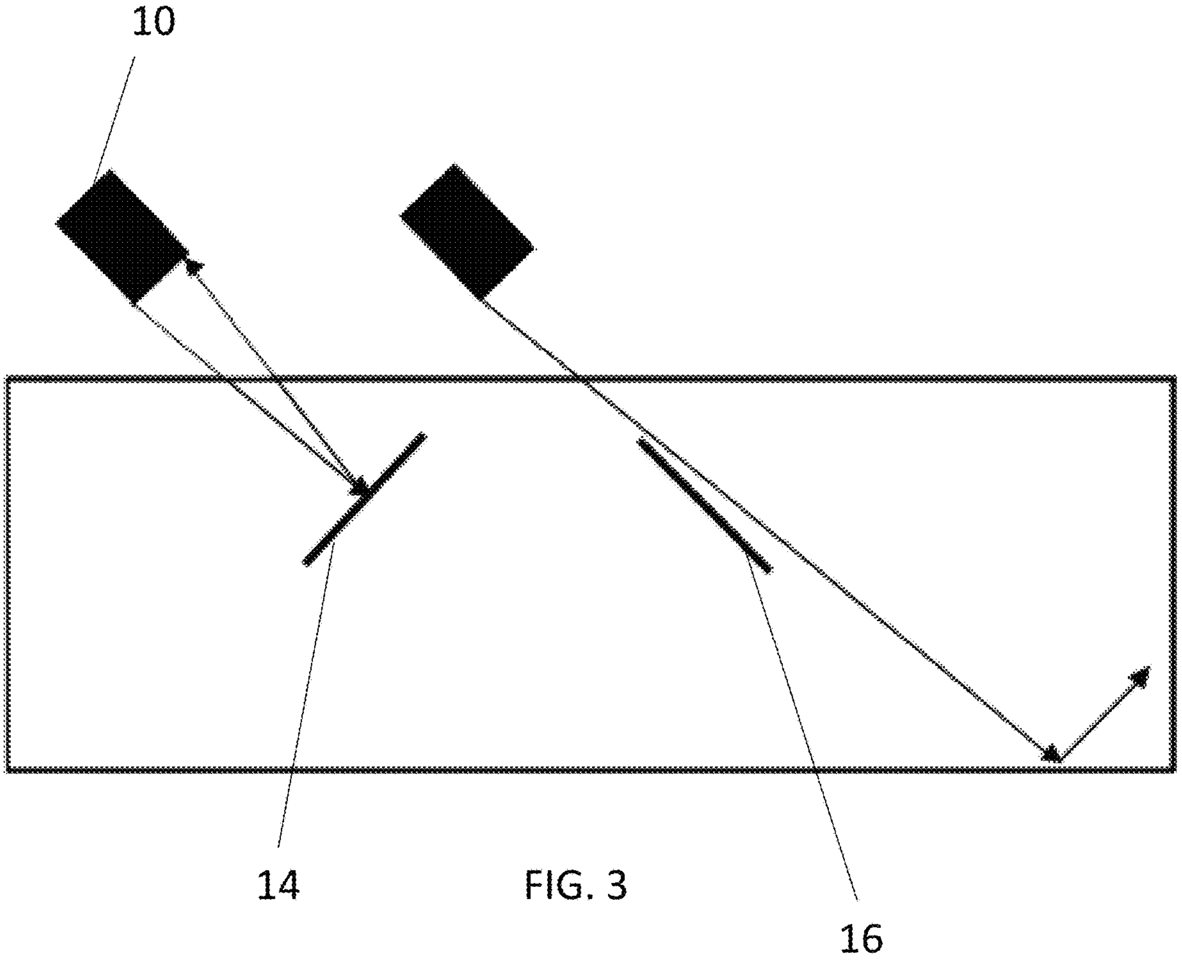
FIG. 3 illustrates a plurality of ultrasonic elements emitting a beam at an acute angle relative to a surface of a test object.

FIG. 3 illustrates a plurality of ultrasonic elements emitting a beam at an acute angle relative to a surface of a test object. One way of accounting for features not parallel to the testing surface of the test object, is to angle the beam produced by the ultrasonic transducer 10 relative to the testing surface of the part. As shown in FIG. 3, the beam is able to be angled such that it is substantially orthogonal to at least one of the features 14, or at least the angle between the beam and the feature is closer to 90° than if the beam were directed orthogonal to the testing surface of the test object. However, FIG. 3 also shows that angling the beam in only a single direction sometimes causes the beam to interact even less with other features 16, especially if the other features 16 are nearly parallel with the new orientation of the beam. Therefore, it is necessary to use a multitude of steering angles to fully investigate all features.

Figure 4:
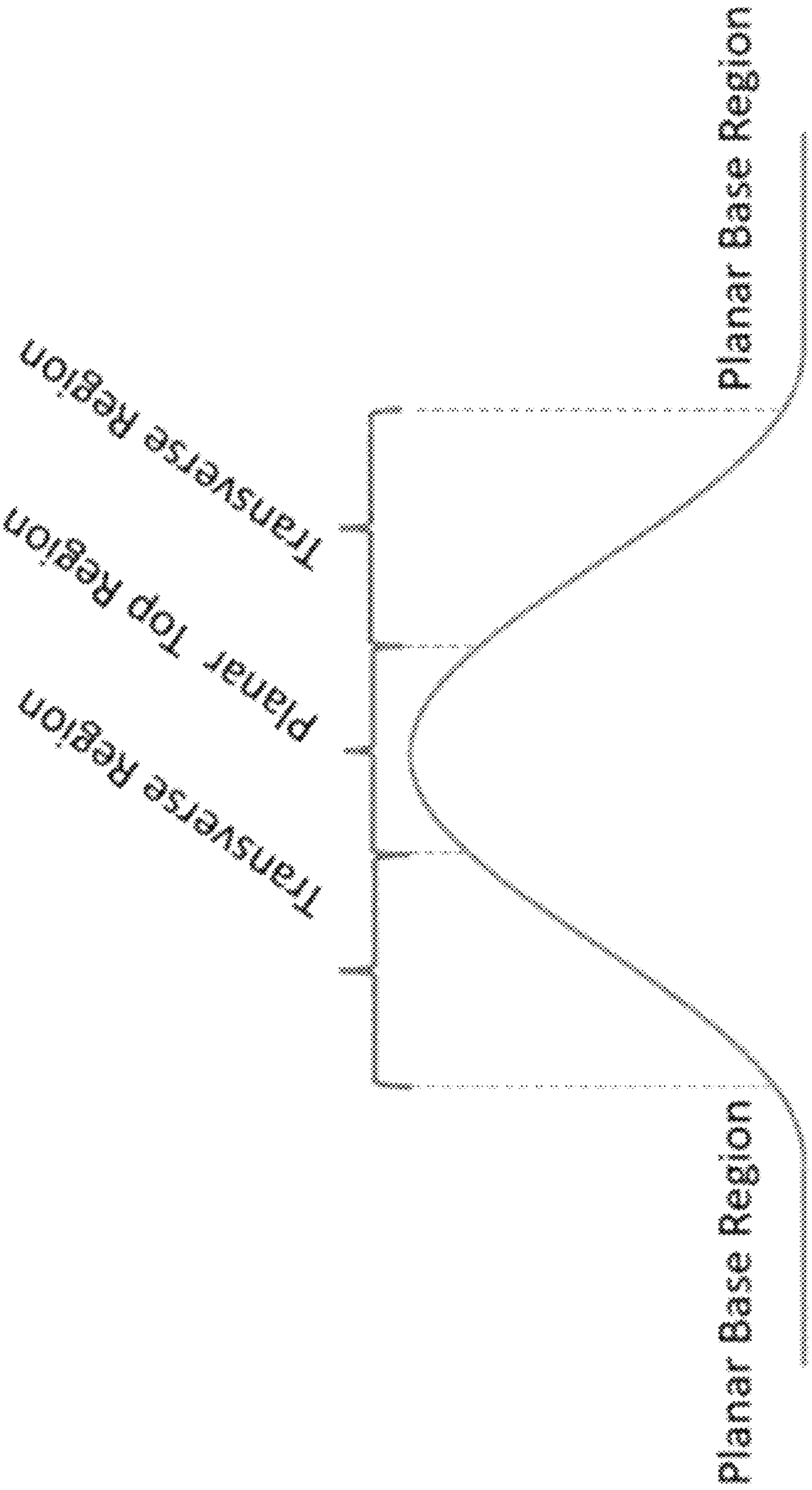
FIG. 4 illustrates a diagram of an exemplary wrinkle.

FIG. 4 illustrates a diagram of an exemplary wrinkle. The base around wrinkles and the peak of the wrinkles are substantially parallel to the surface of the part and thus normal to incident waves. Between the base and the peak, however, are rising regions that are substantially traverse to the direction of incident waves and thus more difficult to detect. Furthermore, the larger the slope of the transverse region, the more difficult those features will be to observe, which is problematic given that wrinkles with higher slopes are a larger issue for the viability of the test object than those with lower slopes.

The present invention provides a system and method for better characterizing wrinkles, especially the transverse region of wrinkles. However, one of ordinary skill in the art will understand that the present invention is not limited to only characterizing wrinkles, but is useful in scanning any defect or other feature within a test object that is transverse to the normal scan direction or contains components that are transverse to the normal scan direction.

Figure 5:
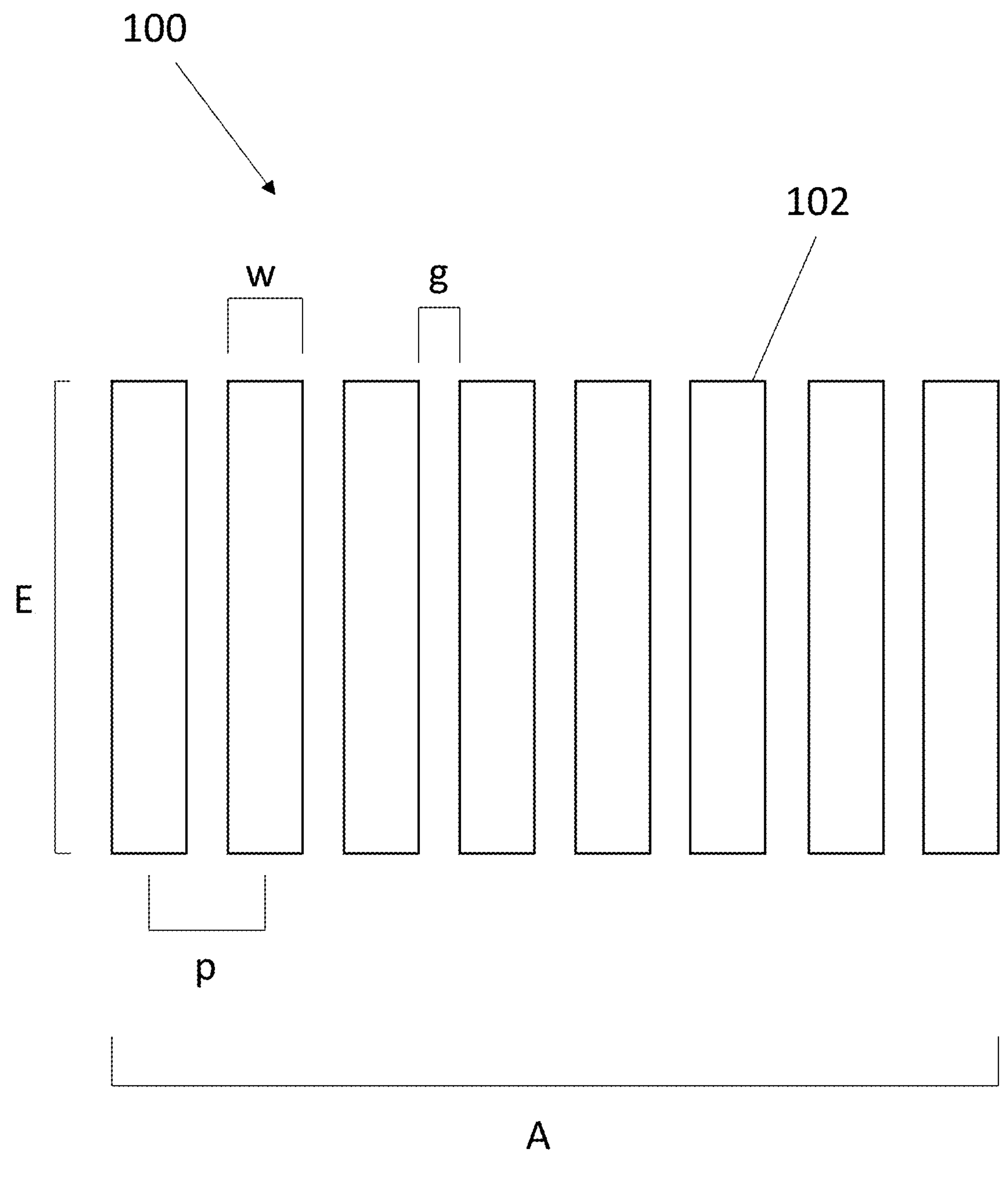
FIG. 5 illustrates a plurality of elements constituting an ultrasonic transducer array according to one embodiment of the present invention.

FIG. 5 illustrates a plurality of elements constituting an ultrasonic transducer array according to one embodiment of the present invention. In one embodiment, the system includes an array 100 of plurality of ultrasonic transducer elements 102. The total width of the array defines the active aperture (A) of the array. The distance between the edges of each element defines the internal element spacing (g) of the array. The distance between the center of each element defines the elementary pitch (p) of the array. The length of the elements defines the elevation (E) of the array. Additionally, the width of each element is defined as W. Each element is attached to a pulser receiver, operable to transmit an electromagnetic pulse to the corresponding transducer, causing the transducer to emit an ultrasonic wave. One of ordinary skill in the art will understand that while FIG. 5 shows an array having eight elements, the present invention is not limited to only eight elements and is able to include any number of elements.

In order to improve spatial resolution, in one embodiment, the array is operated at a frequency of approximately 10 MHz, which is notably greater than frequencies used by other systems. It should be noted that increasing the frequency of the scan, while beneficial for improving spatial resolution, decreases the depth within the part that features are precisely able to be detected and/or characterized. With a frequency of 10 MHz and a typical carbon fiber component, the inspectable depth is on the order of magnitude of approximately 0.25 inches (or 6.35 mm), but this depth will otherwise increase if the frequency is decreased.

Fortunately, the issue of depth resolution is able to be easily addressed by the present invention. In one embodiment, wrinkles are found by performing an initial scan and noting features that do not appear to be cracks and which appear to have a shape or other characteristic recognizable to an inspector as a wrinkle. The area including the wrinkle is then able to be scanned again in order to characterize the wrinkle. In one embodiment, the initial scan and/or a subsequent scan determines an approximate depth of the wrinkle. If the depth exceeds the inspectable range when operating at approximately 10 MHz, the frequency is able to be adjusted so as to be able to inspect the detected wrinkle.

Figure 6A:
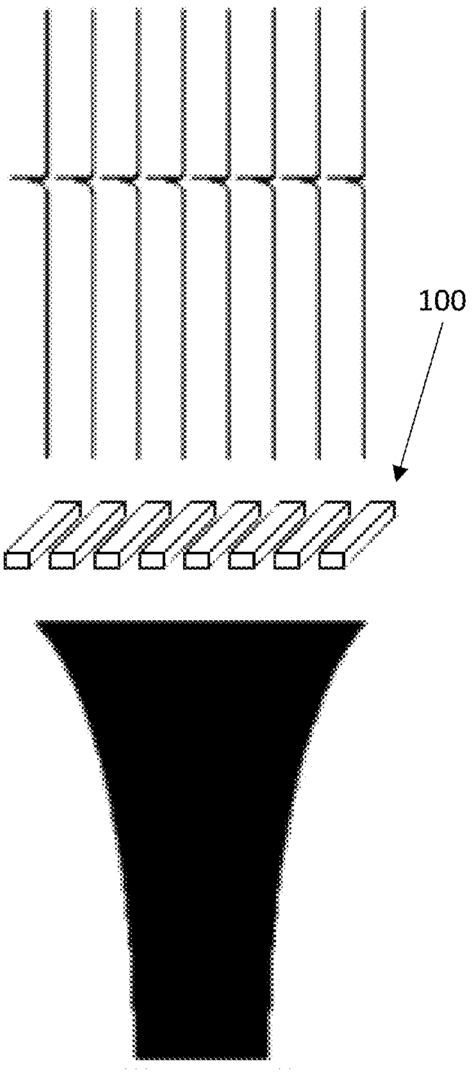
FIG. 6A illustrates a plurality of elements of an ultrasonic transducer array fired to emit a beam in a forward direction according to one embodiment of the present invention.
Figure 6B:
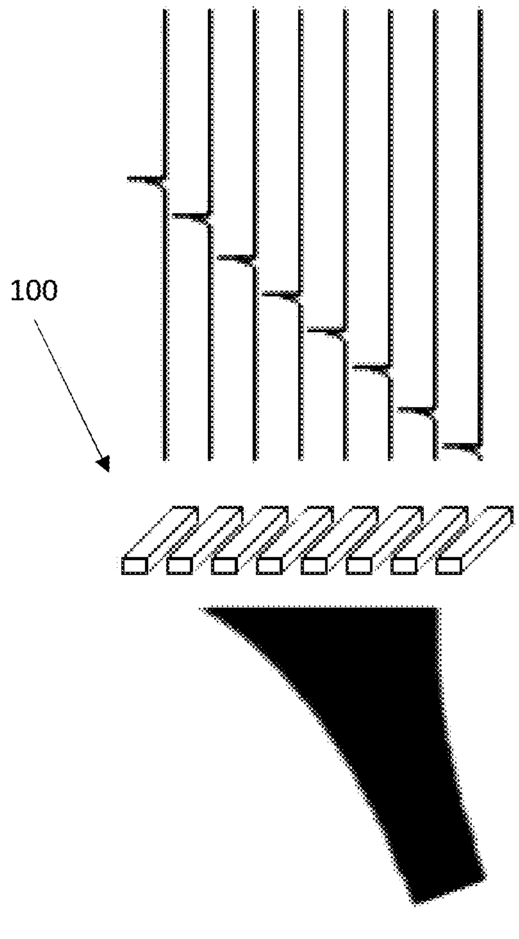
FIG. 6B illustrates a plurality of elements of an ultrasonic transducer array fired to emit a beam at an angle according to one embodiment of the present invention.

FIG. 6A-6B demonstrate the ability to change the angle of an ultrasonic beam based on introducing delays in firing different elements of the ultrasonic transducer array. The angle of the beam produced by the array is able to be altered by changing a delay in which pulses are transmitted to each element of the array. As shown in FIG. 6A, when all the elements are excited at approximately the same time by a pulse of approximately the same magnitude, the beam is oriented straight in a direction substantially orthogonal to the array. However, as shown in FIG. 6B, when each element of the array is excited by a pulse a short time after each element to the left, then the beam is angled to right. Conversely, when each element of the array is excited by a pulse a short time after each element to the right, then the beam is angled to left. Therefore, in one embodiment, the beam produced by the array is angled by changing the focal law of the array. In another embodiment, the beam produced by the array is angled by physically rotating the array while maintaining substantially the same focal law.

In one embodiment, the array is operable to sweep the beam produced by the elements over a range of angles. The angle that each beam is steered is able to be controlled by adjusting the focal laws used to fire the transducer array. In a preferred embodiment, the range of angles is greater than 20°. In one embodiment, the range is between approximately 20° and approximately 180° degrees. In one embodiment, the range is approximately 60°. In one embodiment, the range is centered on a steering angle of 0° (i.e., where the beam is orthogonal to the testing surface of the test object). In this embodiment, a 60° range, for example, means that the array sweeps between steering angles of −30° and 30°. If the range were 20°, then the array sweeps between steering angles of −10° and 10°, and so on. The number of angles scanned within the range varies and, in one embodiment, depends on the number of elements of the array. In one embodiment, a scan is always taken at a steering angle of 0° as well as the maximum steering angle and minimum steering angle within the range, meaning that 3 is the minimum number of scans. In another embodiment, the number of scans within the range includes 5 scans, 7 scans, 9 scans, 15 scans, 31 scans, 35 scans, 51 scans, 101 scans, and so on. The angles that are used to scan in sectorial scanning tend to be limited by factors such as grating lobes, mode conversion of the ultrasound, pitch of the probe, or the aperture of the probe.

In one embodiment, the elements are utilized such that focal distance from each element remains constant through all beams (i.e., true depth focusing), while in another embodiment, the elements are utilized such that the focus is at a constant depth (i.e., fixed depth focusing).

The resolution of a sectorial scan depends on the interval angle between consecutive beams, though typically using only a few angled beams is sufficient for capturing an accurate image of a wrinkle within a part. Still, having a large number of beams is helpful, as the maximum intensity value is obtained when the beams is exactly perpendicular to the component being scanned and, given that the wrinkle has features that rise with varying slopes, getting beams that are perfectly perpendicular to each section of the wrinkle requires a large number of beams. However, increasing the number of beams results in a slower scanning speed and a large increase in required computational power and data. Generally, a set of three beams, with steering angles of −30, 0 and 30 are sufficient in order to capture the full extent of a given wrinkle. However, in one embodiment, five beams, with steering angles of −30, −15, 0, 15, and 30 are used to provide more optimum results.

In one embodiment, the test object is a composite laminate. In one embodiment, the composite laminate includes a plurality of carbon fiber composite layers. In one embodiment, the plurality of carbon fiber composite layers adhered to each other via bond layers between each of the carbon fiber composite layers. In one embodiment, the composite laminate does not include glass fiber or any other material specifically inserted for detection of defects. In one embodiment, the composite laminate includes at least 5 layers. In another embodiment, the composite laminate includes at least 10 layers. In yet another embodiment, the composite laminate includes at least 15 layers. In still another embodiment, the composite laminate includes at least 30 layers. One of ordinary skill in the art will understand that the number of layers in the composite laminate able to be scanned by the present invention is not intended to be limiting and the system is capable of being used on a composite laminate having any number of layers. In one embodiment, the system is capable of detecting and characterizing (e.g., determining the width and/or amplitude of) wrinkles located more than 5 layers deep from the testing surface of the test object. In another embodiment, the system is capable of detecting and characterizing (e.g., determining the width and/or amplitude of) wrinkles located more than 10 layers deep from the testing surface of the test object.

Figure 7:
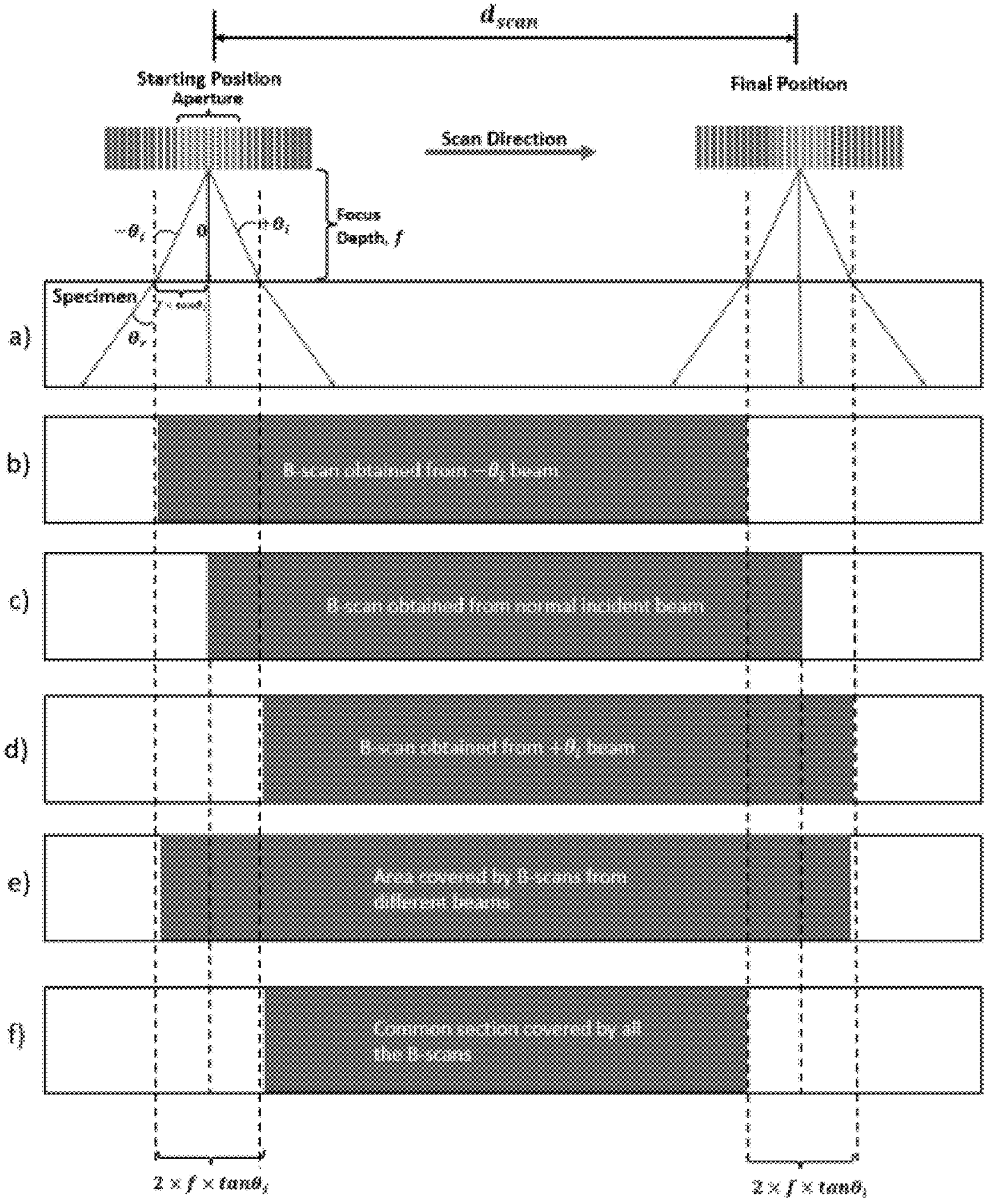
FIG. 7 is an illustration showing the overlap of B-scans produced by a normal incident beam and two angled beams.

FIG. 7 is an illustration showing the overlap of B-scans produced by a normal incident beam and two angled beams. As shown in FIG. 7, because the angled beam will contact the test surface at an offset location relative to the beam of normal incidence, angled beams will produce B-scans of the part that do not entirely overlap with the B-scan section of the normal incidence beam. Furthermore, the normal incident beam will also provide B-scans not covered by the angled beams. Thus, the areas at the edge of the scan must be trimmed in order to provide a one-to-one overlap of comparable regions of all beams in the scan. In one embodiment, the length along which the scanning technique will produce non-overlapping B-scan areas in the sectorial scan is equal to approximately 2 times the focus depth (i.e., distance between the transducer array and the surface of the test object) times the tangent of the steering angle at each end of the dataset. In one embodiment, non-overlapping B-scans are trimmed before the B-scans are combined into an average B-scan.

Figure 8A:
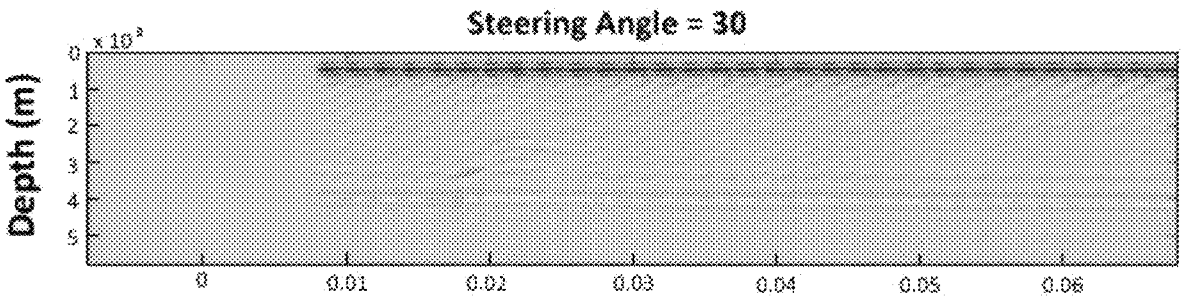
FIG. 8A illustrates a B-scan produced by an ultrasonic transducer array firing a beam at approximately a 60-degree angle relative to a surface of a test object according to one embodiment of the present invention.
Figure 8B:
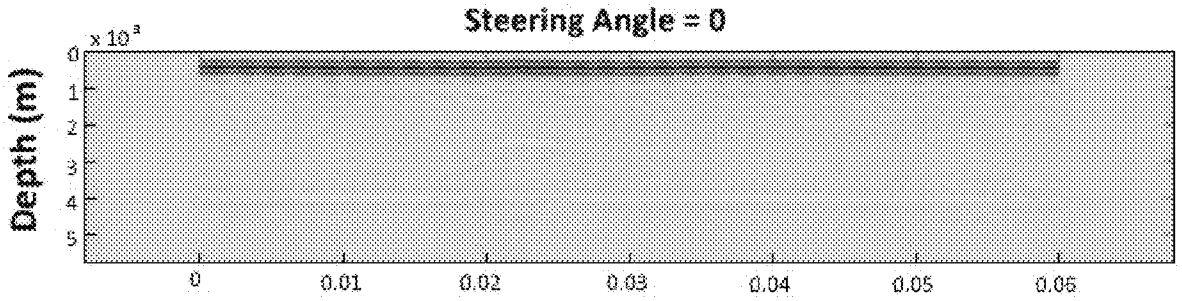
FIG. 8B illustrates a B-scan produced by an ultrasonic transducer array firing a beam at approximately orthogonal to a surface of a test object according to one embodiment of the present invention.
Figure 8C:
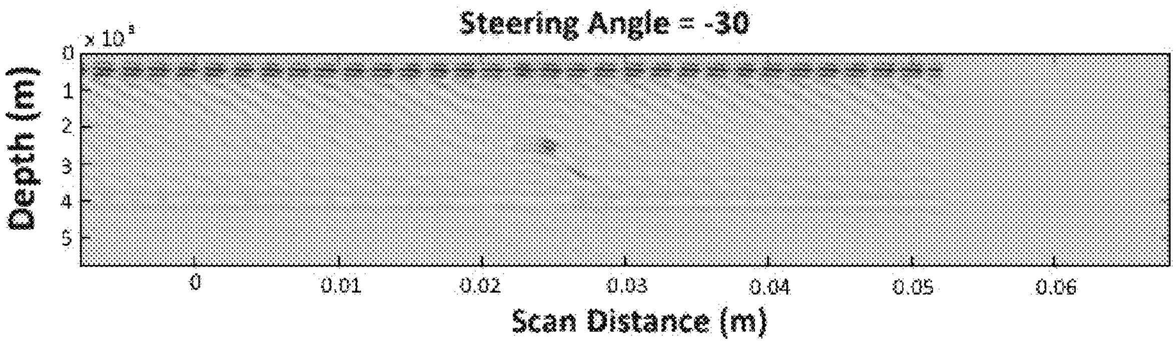
FIG. 8C illustrates a B-scan produced by an ultrasonic transducer array firing a beam at approximately a 120-degree angle relative to a surface of a test object according to one embodiment of the present invention.

FIGS. 8A-8C show B-scans produced by an ultrasonic transducer array firing a beam at approximately at different angles relative to the surface of a test object. FIG. 8A shows a B-scan produced as a result of an ultrasonic transducer array firing a beam oriented at 60 degrees (i.e., a 30-degree steering angle). relative to the testing surface of a test object. The resultant B-scan shows clearly resolution for the left side of the wrinkle and the top of the wrinkle, but fails to detect the right side of the wrinkle. FIG. 8B shows a B-scan produced as a result of an ultrasonic transducer array firing a beam oriented at 90 degrees relative to the testing surface (i.e., a 0-degree steering angle). The wrinkle is barely visible in this B-scan, demonstrating the issues with firing orthogonal to the testing surface of the test object. FIG. 8C shows a B-scan produced as a result of an ultrasonic transducer array firing a beam oriented at 120 degrees (i.e., a −30-degree steering angle) relative to the testing surface of a test object. The right side of the wrinkle is very clearly visible in this image, while the left side of the wrinkle and the crest are not well-resolved.

Figure 9:
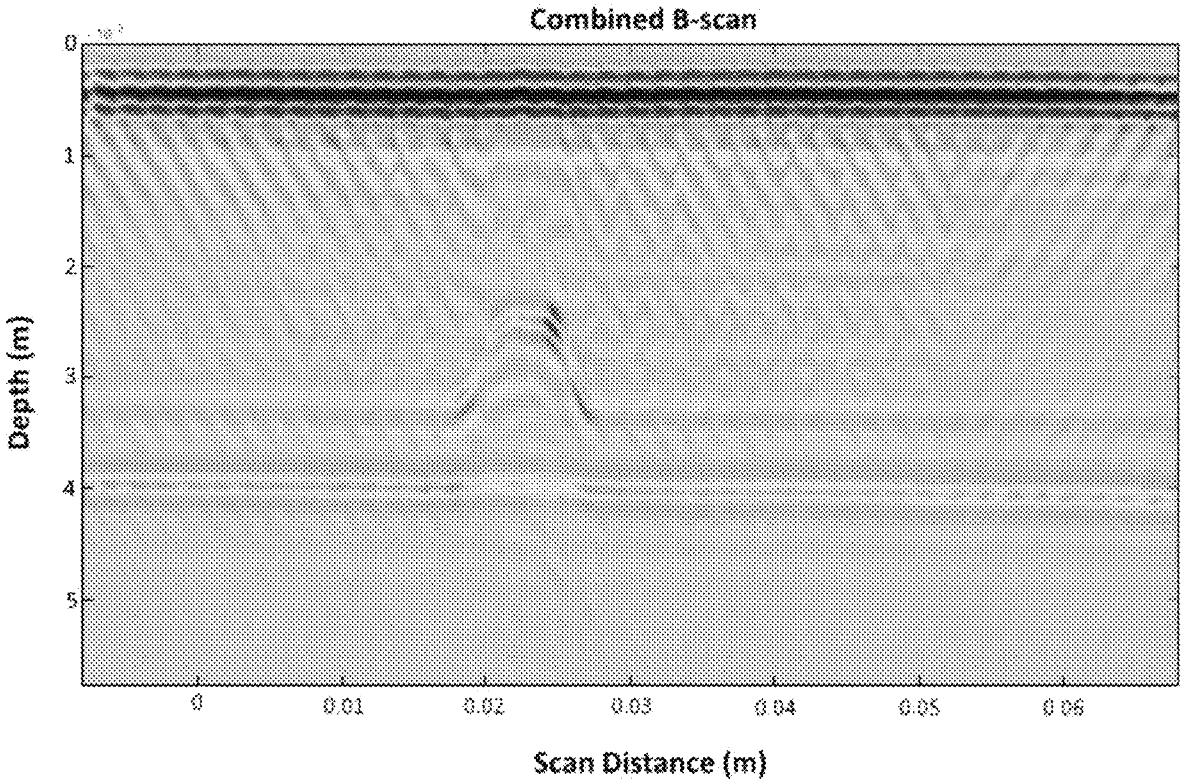
FIG. 9 illustrates a B-scan combining data displayed in FIGS. 8A-8C.

FIG. 9 illustrates a B-scan combining data displayed in FIGS. 8A-8C. Importantly, each of the B-scans individually shown in FIGS. 8A-8C fail to resolve an important portion of the wrinkle or fail to adequate detect the wrinkle at all. However, by combining the scan data into a single combined B-scan, as shown in FIG. 9, the wrinkle is more clearly visible and analyzable. In one embodiment, the combined B-scan is produced by averaging the amplitude values of each of the individual scans. In another embodiment, the combined B-scan is produced as an additive sum of amplitudes of each of the B-scans. In one embodiment, the additive sum is a weighted based on the specific sectorial angle used to generate each B-scan using an angle-corrected gain factor. The angle-corrected gain factor is necessary, as scans taken at wider angles will tend to scatter more and therefore produce a less intense signal. Thus, without correction factors to increase the weighting of wider angled scans, scans normal or close to normal to the part will dominate the resulting image. In one embodiment, the angle-corrected gain factors are determined experimentally and therefore also necessarily take into account other considerations related to the angle of the scans (e.g., material differences in each scan). It should be noted that the angle-corrected gain factors will depend on the frequency of the scan being performed and based on properties of the test object itself, and one cannot use the same angle-corrected gain factors between multiple different types of scans. In yet another embodiment, the system includes an artificial intelligence module operable to automatically indicate areas of each B-scan showing a notable feature. Then artificial intelligence module then automatically combines the indicated areas of each B-scan to stitch together the combined B-scan.

In one embodiment, based on the combined B-scan, the system is operable to automatically determine a start point for the wrinkle and an end point for the wrinkle along one or more dimensions. In one embodiment, the start point for the wrinkle and end point for the wrinkle are determined by an artificial intelligence module. The system is therefore able to automatically determine a width of the wrinkle and/or an amplitude of the wrinkle.

Figure 10:
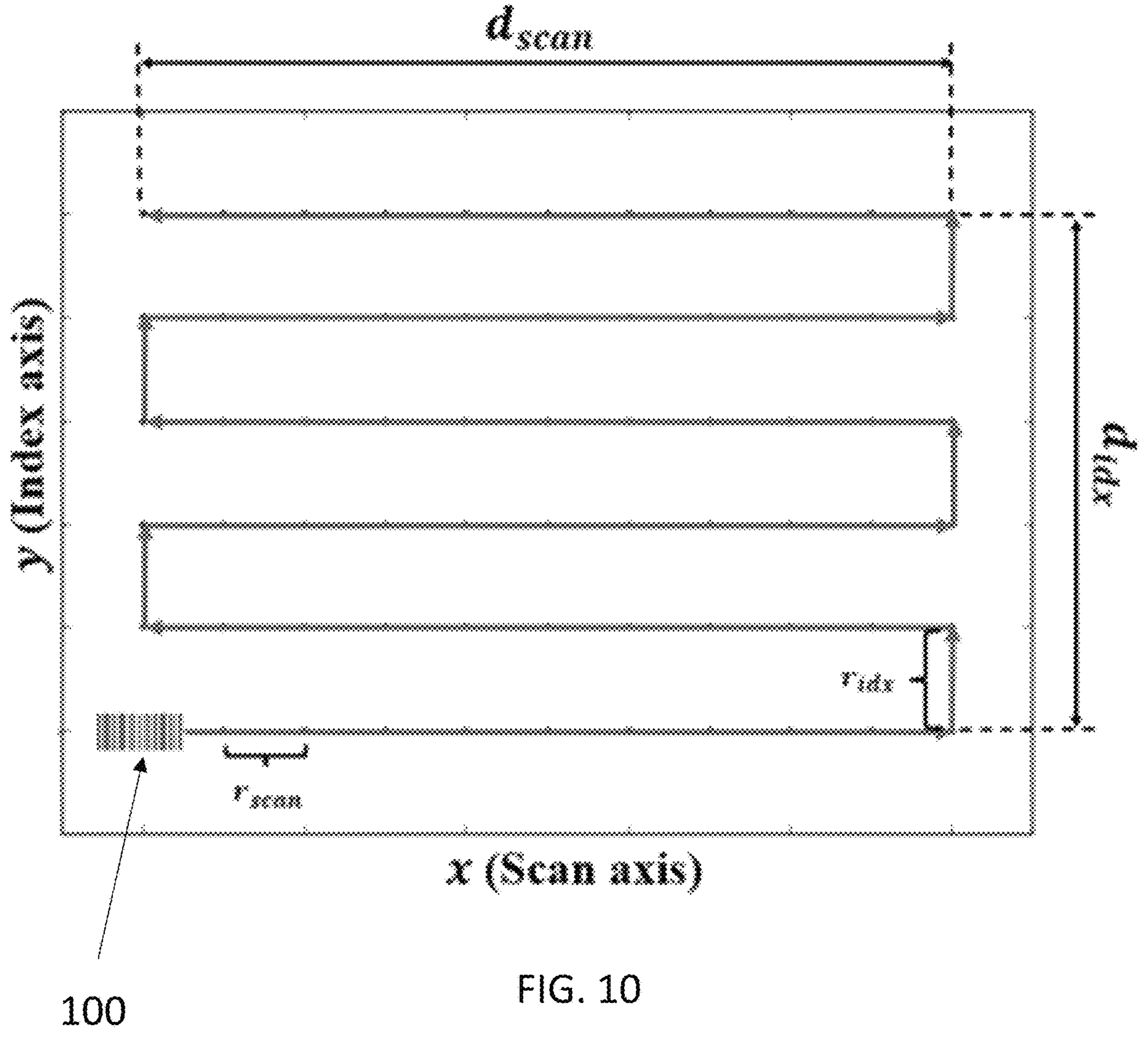
FIG. 10 illustrates a raster scan pattern according to one embodiment of the present invention.

In one embodiment, the transducer array is translated above the testing surface of the test object, such that it performs a raster scan, such as, but not limited to, the pattern shown in FIG. 10. In one embodiment, a raster scan is performed for each different focus law of the transducer array, such that one scan is performed with the beam having a steering angle of 0°, one scan is performed with a steering angle of −30°, one scan is performed with a steering angle of 30°, and so on. In another embodiment, the raster scan is primarily performed at a single steering angle (e.g., 0°). However, an artificial intelligence module is operable to analyze the scan data in real time. If an anomaly (e.g., at least one anomalously high amplitude value) indicating a possible feature (e.g., a wrinkle) appears in the scan, then the raster scan pattern is paused, and a series of localized scans are performed in the vicinity of the anomaly with the series of localized scan having different steering angles. This prevents the system from needing to fully scan the part multiple times, saving time and increasing efficiency. In another embodiment, if the artificial intelligence module detects an anomaly, at least one indicator is released by the transducer array to mark the location of the anomaly to return to at a later time. In one embodiment, releasing the at least one indicator includes dropping liquid dye on the location, and/or marking the location with at least one writing utensil (e.g., pencil, pen, marker, etc.). In yet another embodiment, an initial scan at a first steering angle is performed. Based on analysis of the scan data after the initial scan is performed, a targeted sectorial scan of potential wrinkle areas is subsequent performed.

Figure 11:
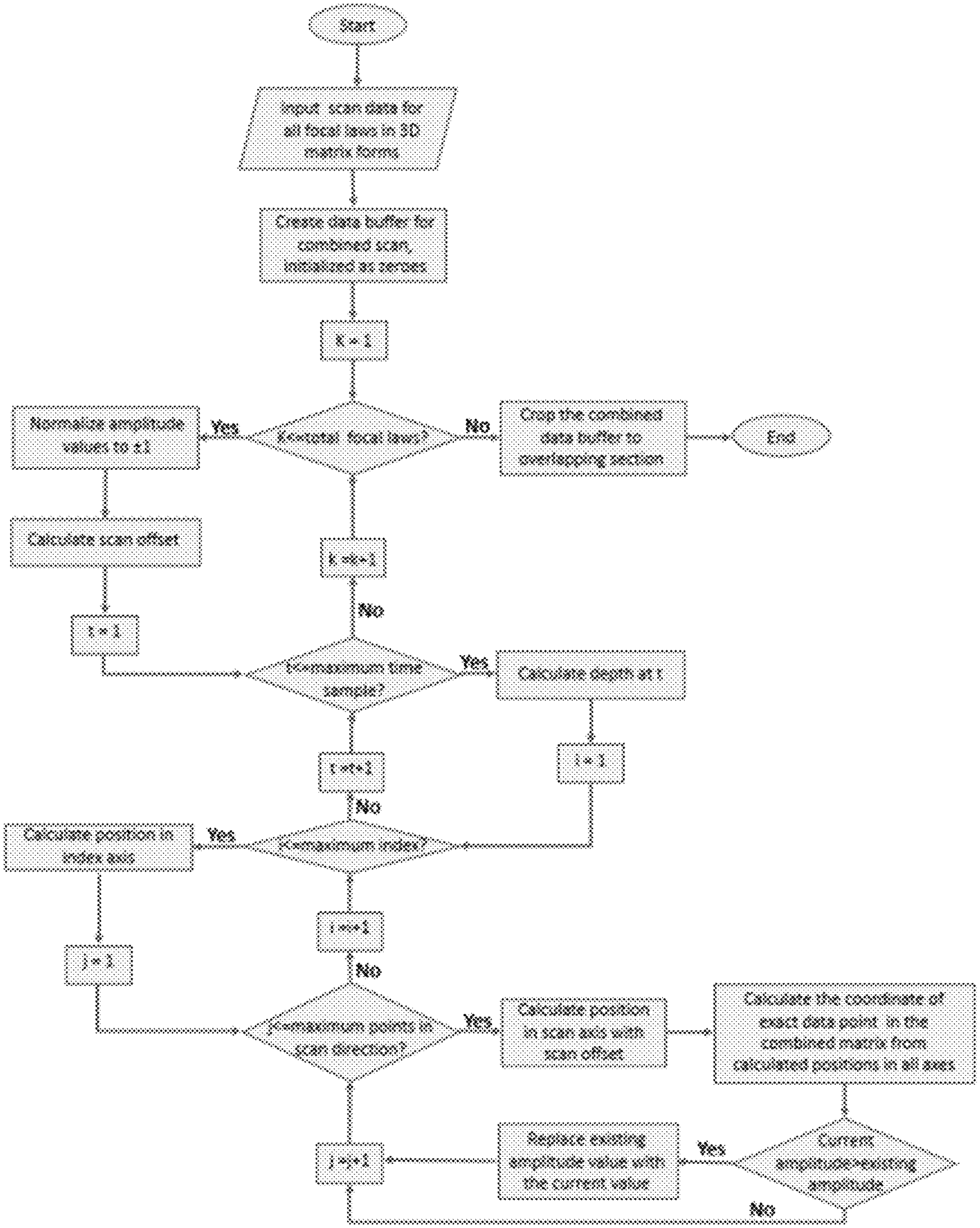
FIG. 11 illustrates a flow chart showing a method of processing scan data from scans taken at different angles to produce a single united data set according to one embodiment of the present invention.

The raster scan pattern generates a volumetric scan of the part by use of a novel post-processing method described in FIG. 11. The method loops through each of the time samples scan in the scan along each axis. The raster scan includes a number of points scans are taken, in total a number N, with the distance between each scan representing the scan resolution, $r_{scan}$ (taken along the scan axis) and an index resolution, $r_{index}$ (taken along the index axis), along a total distance travelled along the scan axis, $d_{scan}$ and a total distance travelled long the index axis, $d_{index}$. A 3D matrix is able to be generated with points along the scan direction, index direction, and time dimension for each focal law (i.e., each angle) used for the scan. These matrices are used to generate the volumetric scan. An empty (i.e., entries set to 0) 3D buffer is then initialized that is able to encapsulate all the 3D matrices for each of the focal laws, while maintaining their relative offsets in the scan direction.

For each position in scan, index, and time dimensions, the amplitude values are compared with existing values in the 3D buffer matrix. If the existing absolute amplitude value in the buffer matrix is less than the current amplitude value, the existing value is replaced with the current value, representing the fact that features that have significant reflected energy will show higher amplitudes in A-scans. This process is repeated for each focal law, providing the maximum value for each point as determined by scans of all angles, allowing for features that are transverse to one scan to appear clearly in the overall matrix. Because this matrix takes the highest value for all scans, it is able to also store value for positions only examined by a subset of the angled scans, which are able to be trimmed or discarded if the user wants to select only those positions with consensus from scans with all utilized focal laws.

In one embodiment, a low pass filter is used on the raw A-scan data to filter high frequency noise to produce adjusted, or filtered, A-scan data. In one embodiment, the passband frequency is set to a value that allows the filter to cut off high frequency components outside the natural frequency spectrum of the probe. In one embodiment, the passband frequency is set to approximately 10 MHz.

Figure 12:
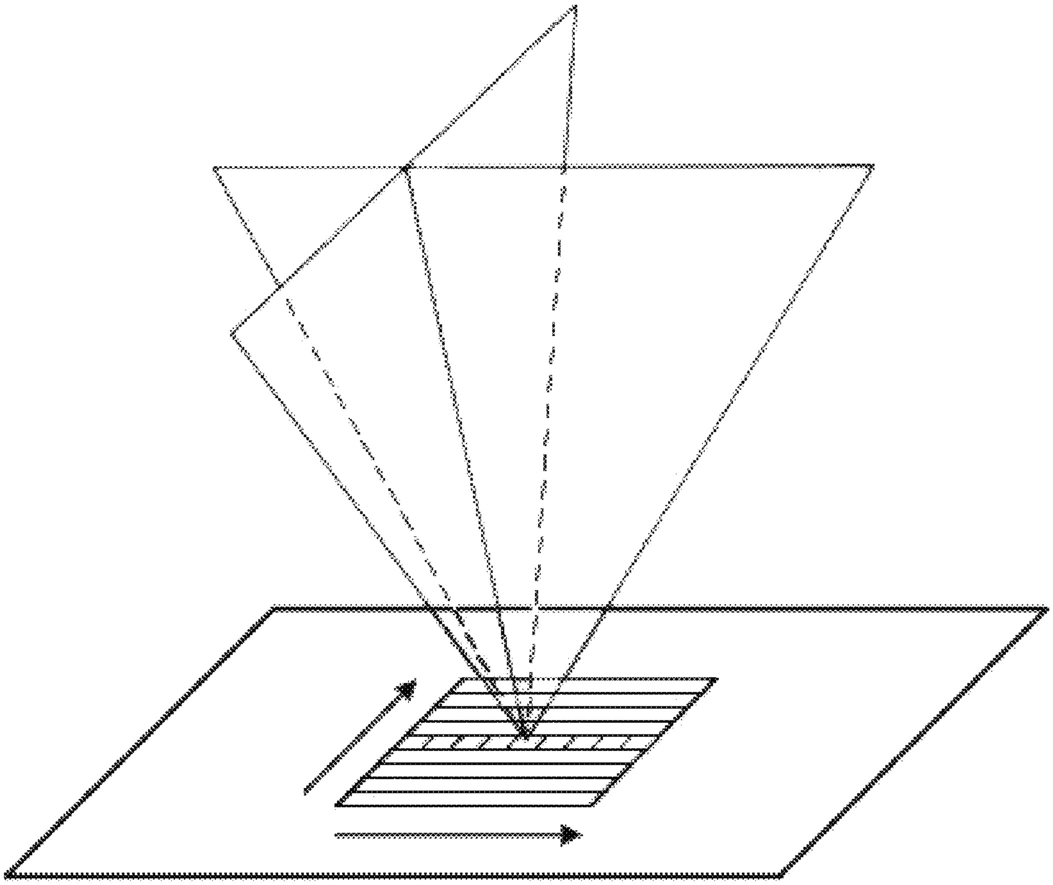
FIG. 12 illustrates a two-dimensional phased array according to one embodiment of the present invention.

FIG. 12 illustrates a two-dimensional phased array according to one embodiment of the present invention. While FIG. 5 shows a transducer array with elements spaced along a single dimension, in one embodiment, the present invention includes a transducer array with elements spaced along a second dimension as well. A two-dimensional (2D) transducer array allows the array to sweep across angles in two different directions, as shown in FIG. 12. Wrinkles are often represented as two-dimensional disturbances in a series of layers. In reality, wrinkles often have three-dimensional (3D) geometry, not having the same amplitude through the thickness of the layers and sometimes not persisting through the entire thickness of the layers at all. While existing techniques use a series of B-scan slices to attempt to gain an understanding of how the wrinkle's geometry changes through the thickness of the part, similar issues exist in resolving edges of the wrinkle as exist in the 2-dimensional case. Furthermore, by using a 2D transducer array, the transducer array does not need to be rotated in order to produce B-scans along a different axis, and instead a different subset of the elements is able to be fired to produce a similar result. This therefore reduces or eliminates the need to physically turn the array in order to scan in two different directions.

Figure 13:
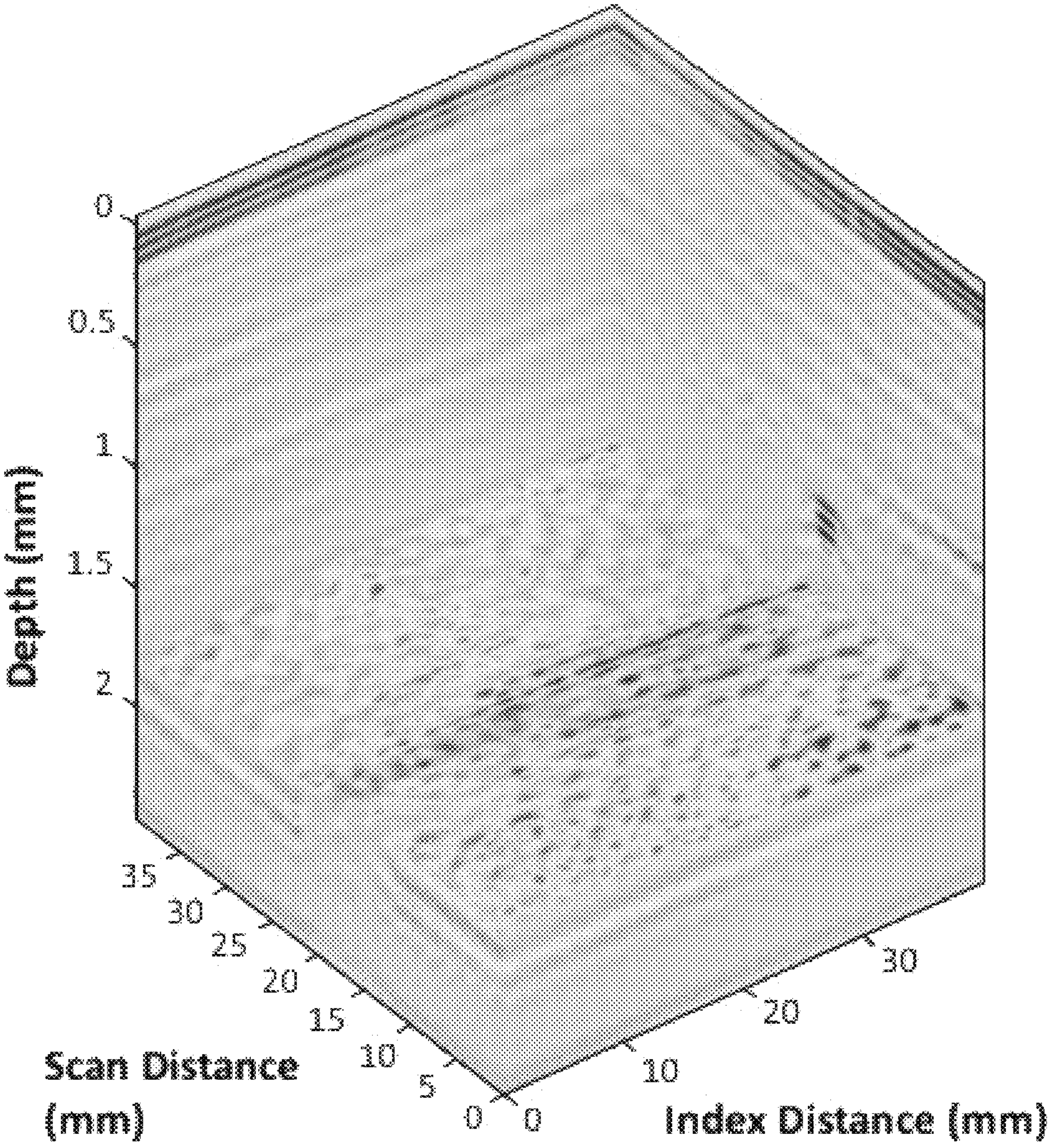
FIG. 13 illustrates a three-dimensional graphical representation of a test object including a wrinkle according to one embodiment of the present invention.

FIG. 13 illustrates a three-dimensional graphical representation of a test object including a wrinkle according to one embodiment of the present invention. The plot presented in FIG. 13 provides a combined result of a plurality of scans taken at a plurality of different angles (including normal to the test object). The coloration in the plot indicates a difference in intensity of returned signal, which allows for the identification of a raised portion of the part corresponding to a wrinkle, as shown in blue. In another embodiment, in order to better visualize the shape of the wrinkle, the system is able to automatically present an "equal intensity" graph, showing areas of the scan having approximately the same returned intensity signal. If the layer is flat, for example, then a plot of equal returned intensity will also be flat, as approximately the same intensity signals will be returned from each point along the layer at the same depth. However, if there is a wrinkle, then the intensity of the received signals from the apex of the wrinkle will not be equivalent to the intensity of the received signals from the surrounding material at the same depth, but rather be substantially the same as received signals from the surrounding material at different depths.

In one embodiment, the system and method of the present invention is used in a manufacturing setting to determine whether defects were introduced during the manufacturing process or whether intended features or structures were properly included within a manufactured component. In one embodiment, the wrinkle characterization data from the present invention is used to edit or alter a digital twin of the manufactured part and/or to automatically adjust a manufacturing process to prevent creation of wrinkles or other unintended features in future items. Including the data in a digital twin improves the ability to teach manufacturers where mistakes occur in the process and the ability to re-design the process to produce more consistent products.

In one embodiment, the ultrasonic element array is attached (e.g., via adhesive, magnetic connection, bolts, screws, hook and loop elements, etc.) to an end effector of a robotic arm. In one embodiment, the robotic arm is operable to move the ultrasonic element array in a raster pattern over a test object and/or to physically angle the array relative to a top, testing surface of the test object.

In one embodiment, based on test data received from the sectorial scans performed according to the present invention, at least one connected processor is operable to automatically outline and identify boundaries of a wrinkle on a B-scan or C-scan image generated by the processor. In one embodiment, this automatic outlining and identification is performed by at least one machine learning module. In another embodiment, at least one graphical user interface (GUI) used to access and view B-scan or C-scan data generated from the sectorial scans of the present invention is operable to receive user-selected inputs of particular positions on the scan to allow for manual identification and outlining of a wrinkle.

Figure 14:
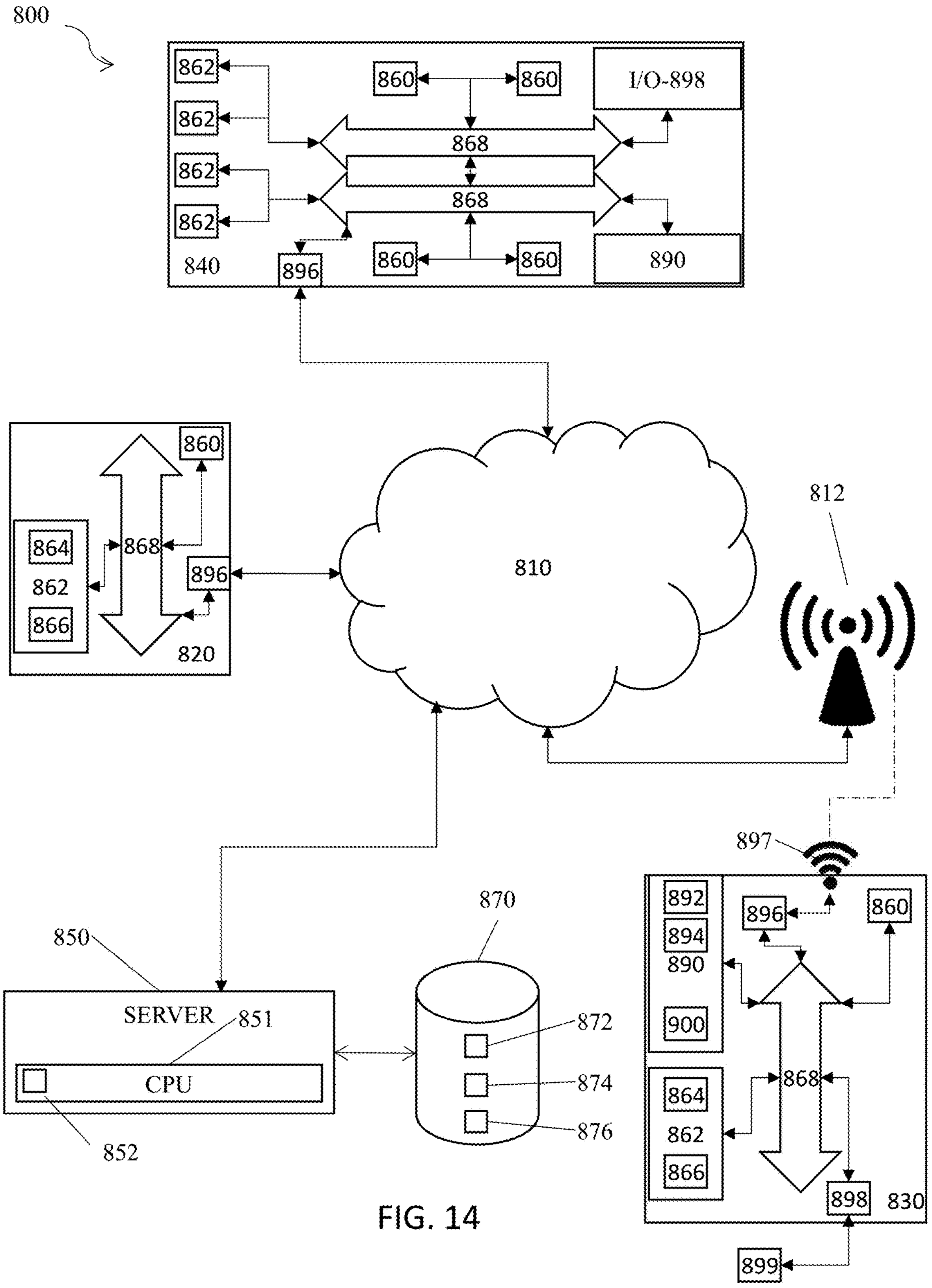
FIG. 14 is a schematic diagram of a system of the present invention.

FIG. 14 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 14, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 14, is operable to include other components that are not explicitly shown in FIG. 14, or is operable to utilize an architecture completely different than that shown in FIG. 14. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An ultrasonic non-destructive testing system for detecting and characterizing transverse features, comprising:

a plurality of ultrasonic elements constituting an ultrasonic array;

one or more pulser receivers configured to transmit pulses to actuate the plurality of ultrasonic elements; and a processor;

wherein, in conducting a scan of a test object, the one or more pulser receivers are operable to introduce individual delays in signals actuating each of the plurality of ultrasonic elements to steer a beam produced by the ultrasonic array;

wherein the ultrasonic array is configured to generate scans of the test object across a range of angles, thereby generating a sectorial scan from a particular point above the test object;

wherein the ultrasonic array is moved in a raster motion above the test object to produce a plurality of sectorial scans providing volumetric scan data;

wherein the processor generates an image of the test object including at least one wrinkle based on the volumetric scan data; and wherein an angle-corrected gain factor is applied to individual angle scans constituting each sectorial scan, and wherein the angle-corrected gain factor for higher magnitude steering angles is greater than the angle-corrected gain factor for lower magnitude steering angles.

2. The system of claim 1, wherein the ultrasonic array is operating at a frequency of approximately 10 MHz.

3. The system of claim 1, wherein the range of angles for each sectorial scan is approximately 60°.

4. The system of claim 1, wherein the ultrasonic array is affixed to an end effector of a robotic arm and wherein the robotic arm moves the ultrasonic array in the raster motion above the test object.

5. The system of claim 1, wherein the processor includes a machine learning module configured to automatically identify and outline the at least one wrinkle in the image.

6. The system of claim 1, wherein a low-pass filter filters out high frequency components of the plurality of sectorial scans.

7. The system of claim 1, wherein the test object is a composite laminate material and wherein the at least one wrinkle is greater than 5 layers deep within the test object.

8. An ultrasonic non-destructive testing method of detecting and characterizing transverse features, comprising:

one or more pulser receivers transmitting pulses to actuate a plurality of ultrasonic elements, constituting an ultrasonic array, to conduct a scan;

the one or more pulser receivers introducing individual delays in signals actuating each of the plurality of ultrasonic elements to steer a beam produced by the ultrasonic array;

the ultrasonic array generating scans of the test object across a range of angles, thereby generating a sectorial scan from a particular point above the test object;

moving the ultrasonic array in a raster motion above the test object to produce a plurality of sectorial scans, thereby providing volumetric scan data;

a processor generating an image of the test object including at least one wrinkle based on the volumetric scan data; and applying an angle-corrected gain factor to individual angle scans constituting each sectorial scan, wherein the angle-corrected gain factor for higher magnitude steering angles is greater than the angle-corrected gain factor for lower magnitude steering angles.

9. The method of claim 8, further comprising operating the ultrasonic array at a frequency of approximately 10 MHz.

10. The method of claim 8, wherein the range of angles for each sectorial scan is approximately 60°.

11. The method of claim 8, wherein the ultrasonic array is affixed to an end effector of a robotic arm and wherein the robotic arm moves the ultrasonic array in the raster motion above the test object.

12. The method of claim 8, further comprising a machine learning module automatically identifying and outlining the at least one wrinkle in the image.

13. The method of claim 8, further comprising a low-pass filter filtering out high frequency components of the plurality of sectorial scans.

14. The method of claim 8, wherein the test object is a composite laminate material and wherein the at least one wrinkle is greater than 5 layers deep within the test object.

15. An ultrasonic non-destructive testing system for detecting and characterizing transverse features, comprising:

a plurality of ultrasonic elements constituting an ultrasonic array; and one or more pulser receivers configured to transmit pulses to actuate the plurality of ultrasonic elements;

wherein, in conducting a scan of a test object, the one or more pulser receivers are operable to introduce individual delays in signals actuating each of the plurality of ultrasonic elements to steer a beam produced by the ultrasonic array;

wherein the ultrasonic array is configured to generate scans of the test object across a range of angles, thereby generating a sectorial scan from a particular point above the test object; and wherein an angle-corrected gain factor is applied to individual angle scans constituting each sectorial scan, and wherein the angle-corrected gain factor for higher magnitude steering angles is greater than the angle-corrected gain factor for lower magnitude steering angles.

16. The system of claim 15, wherein a low-pass filter filters out high frequency components of the plurality of sectorial scans.

17. The system of claim 15, wherein the ultrasonic array is operating at a frequency of approximately 10 MHz.

18. The system of claim 15, wherein the range of angles for each sectorial scan is approximately 60°.

* * * * *